United States Patent [19]

Andreasen

[11] Patent Number: 4,767,715
[45] Date of Patent: Aug. 30, 1988

[54] GERMINATION FLOOR SYSTEMS

[76] Inventor: Norman H. Andreasen, 1522 Norwood Ave., Itasca, Ill. 60143

[21] Appl. No.: 103,597

[22] Filed: Oct. 2, 1987

Related U.S. Application Data

[63] Continuation-in-part of Ser. No. 687,598, Dec. 31, 1984, Pat. No. 4,698,309.

[51] Int. Cl.[4] .............................................. C12C 1/06
[52] U.S. Cl. ...................................... 435/302; 34/238
[58] Field of Search ...................... 34/237, 238, 225; 435/302, 305, 306, 310, 312

[56] References Cited

U.S. PATENT DOCUMENTS

| | | | |
|---|---|---|---|
| 364,269 | 6/1887 | Lewandowski | 34/237 |
| 582,434 | 5/1897 | Prinz | 435/302 |
| 595,883 | 12/1897 | Kuehl et al. | 34/237 |
| 850,214 | 4/1907 | Dornfeeld | 34/237 |
| 1,414,061 | 4/1922 | Young | 34/238 |
| 1,576,294 | 3/1926 | Allemand | 34/238 |
| 1,906,603 | 5/1933 | Hungerford | 34/238 |
| 2,683,427 | 7/1954 | Blanning | 34/238 X |

Primary Examiner—James C. Yeung
Assistant Examiner—Carl D. Price
Attorney, Agent, or Firm—Edward D. Gilhooly

[57] ABSTRACT

A germination floor system for a malt plant having a plurality of pivotally mounted tray assemblies movable between a horizontal position for supporting grain during germination and an approximate upright orientation to provide access beneath the floor for cleaning. The tray assemblies are capable of being manually moveable to the cleaning position or, alternatively, may be fitted with a pneumatic cylinder and/or spring devices to facilitate movement. In the vertical cleaning position, the individual tray assemblies are fixed in position to prevent injury to personnel beneath the structure. The tray assembly includes sheets that minimize the presence of exposed edges.

3 Claims, 9 Drawing Sheets

GERMINATION FLOOR SYSTEMS

BACKGROUND OF THE INVENTION

This is a continuation-in-part of my copending application Ser. No. 687,598 filed Dec. 31, 1984 now U.S. Pat. No. 4,698,309.

This invention relates in general to the malting industry and, in particular, to germination floor systems used in malt plants.

More specifically, but without restriction to the particular use which is shown and described, this invention relates to germination floor assemblies having pivotally mounted tray assemblies movable between a horizontal grain germination position to an approximate upright orientation to provide access for cleaning. The pivotally mounted tray assemblies of the invention may either manually be moved between the foregoing positions as desired or, alternatively, fitted with cooperating power means and/or resilient means to aid in manipulation of the tray assemblies.

As is well known, beer is an alcoholic drink made from malt, hops, and other ingredients. Malt is derived from the conversion of barley in a long known process. First, the barley is placed on a germination floor and is subjected to a temperature of 68° F. at 100% humidity for three days in a malt plant. While undergoing the germination process, the grain is periodically agitated by turning machines in a well-known technique. After germination, the malt is then moved to a kiln and is dried for approximately two days. After undergoing drying, the malt is held in storage for up to several months for shipment to the brewery.

After each batch of malt is processed on the germination floor, it is necessary to wash down the trays of the floor from the top, and then underneath the system to remove accumulated off-fall material and prevent the formation of slime and other unsanitary contamination conditions. In known constructions, the traditionally used germination floor includes a pair of permanent trays on each side of the compartment and extends approximately 60–160 feet, depending on the size of the compartment. Either two or three rows of removable trays are located down the center of the compartment, and are laid on a multitude of supporting columns which, in most cases, are permanent.

For years, the cleaning process has required that the two or three rows of trays in the center be physically lifted up, propped against some object, such as the wall, and the area beneath the floor by manually cleaned with a strong chemical wash as required. The procedure is a slow, unskilled and physically demanding task subject to labor exhaustion and injury. In addition, the permanent trays along the side walls of the germination compartment are particularly difficult and inaccessible to clean on the underside of the floor, even with the center panels removed. Because of inaccessibility, it is a common practice that the work crew does not clean beneath the permanent trays so that handfuls of contaminated slime can accrue. This incomplete cleaning of trays has long been a contention and concern of the malt users, such as the beer brewers.

SUMMARY OF THE INVENTION

It is therefore an object of the invention to provide an improved germination floor system for use in the malting process.

Another object of the invention is to provide a germination floor system capable of fitting the entire floor to a position fully exposed for easy and rapid cleaning.

A further object of the invention is to provide a germination floor system capable of being moved between a horizontal and an approximate upright cleaning position in less time and with less effort.

Still another object of the invention is to reduce the force required for moving a germination floor tray to a raised position for cleaning.

A still further object of the invention is to increase the safety of retention of a tray of a germination floor system in the raised position once elevated into the upright position.

Still another object of the invention is to provide a resiliently assisted, pivotally mounted tray assembly in a germination floor system to aid in manipulation of the individual floor units of the system.

Still another object of the invention is to provide a tray assembly for a tilt up germination floor system having the tray sheet of each tray assembly bent at least over one side of the tray frame to reduce the presence of exposed edges.

Still another object of the invention is to use a tray side frame formed as a bar.

Still another object of the invention is to improve end to end contact of tray assemblies.

These and other objects are attained in accordance with the present invention wherein there is provided an improved germination floor system having a plurality of pivoted tray assemblies, which may be moved between a horizontal malt supporting position to a more upright orientation to provide access to the underside of the floor for cleaning and maintaining proper sanitary conditions in the malt house. The individual pivotally mounted tray assemblies of the invention are either manually operable in an improved manner, or power assisted, as desired. The manually operated system reduces the effort required in raising an individual floor tray in a safe and controlled manner to a cleaning position, as compared to prior techniques, and includes means to anchor the generally upright tray assemblies for the safety of persons cleaning the germination compartment. The mounting of the manual tray assemblies of the invention is uniquely arranged about a pivot axis in side-by-side relationship such that increased access to areas beneath the germination floor is possible since substantially all of the floor area is open and available for a cleaning operation. Each side-by-side tray assembly is pivotally mounted along parallel axes to permit each floor section to be raised in a rapid manner along about both axes for increased efficiency. In a second embodiment of the invention, power means are provided to automatically move each tray section between a horizontal and raised position. A unique spring technique may be used in conjunction with either the manual version or the power operated version of the germination floor system herein disclosed for added ease in operating the tray assemblies.

BRIEF DESCRIPTION OF THE DRAWINGS

Further objects of the invention, together with additional features contributing thereto and advantages accruing therefrom, will be apparent from the following description of preferred embodiments of the invention which are shown in the accompanying drawings with like reference numerals indicating corresponding parts throughout, wherein.

DESCRIPTION OF THE PREFERRED EMBODIMENTS

Referring now to FIGS. 1, 2, 4 and 5, there is illustrated a first embodiment of the germination floor system of the invention, generally designated by reference numeral 2. Germination floor system 2 is intended to be used in a germination compartment in which barley is subjected to a temperature around 68 degrees, 100% humidity, for several days, as is well known in the industry. Although each germination compartment may differ in size from place to place, the germination floor system 2 may extend for a length of more than 100 feet and a width of 16 or more feet. In the germination compartment, the grain is placed upon the horizontally arranged floor 4 having a plurality of tray assemblies 6. Turning machines (not shown) are employed to traverse the length of the floor and stir the grain during germination on a periodic basis.

Figures 1, 2:
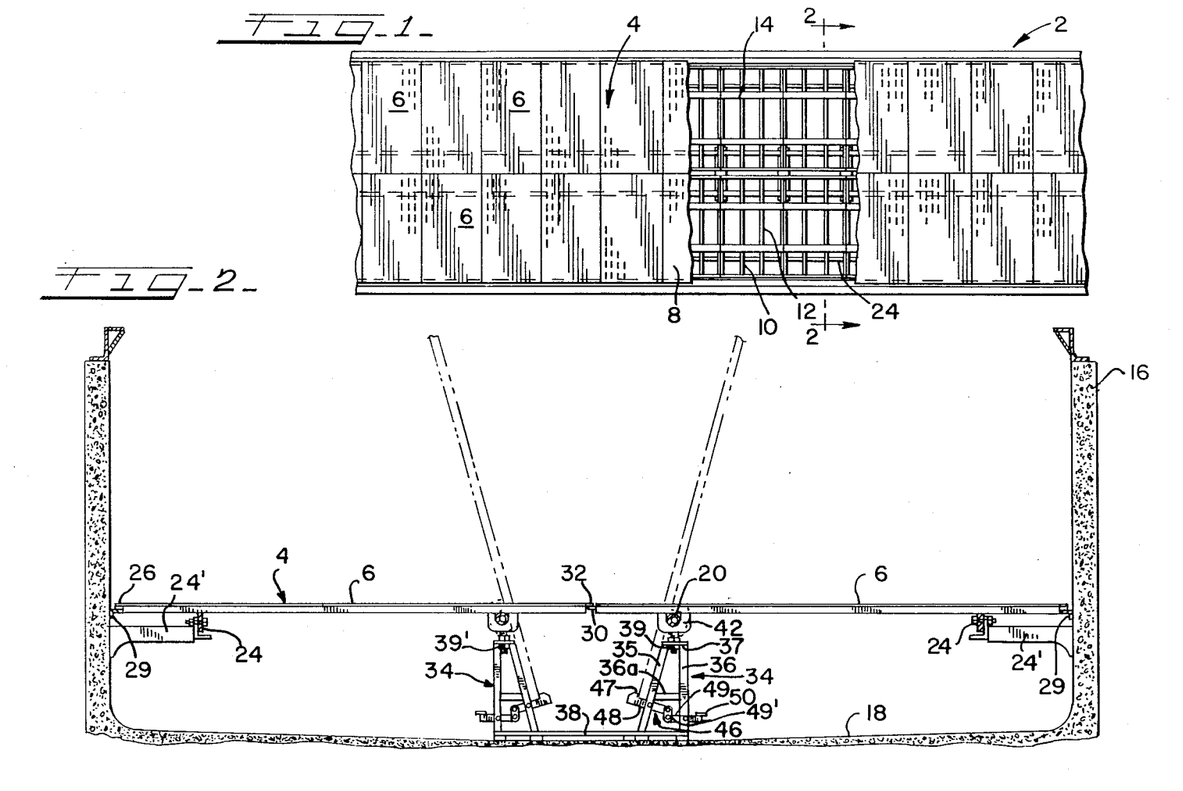
FIG. 1 is a partial top schematic view, with parts in section, of a first embodiment of the germination floor system of the invention.
FIG. 2 is a sectional view on an expanded scale and taken along lines 2—2 of FIG. 1.

The tray assemblies 6 are illustrated being arranged as pairs along the length of the germination floor 4 and are independently pivotable to the position shown in phantom in FIG. 2, as will be apparent. It is also within the scope of the invention to arrange the tray assemblies in a single row of plurality of trays or having more than two rows as conditions and desired objectives dictate (not shown). Each tray assembly 6 includes an upper sheet 8 fabricated from perforated metal which is suitably affixed to a tray frame 10, such as by welding, rivets, crimping and the like. The tray frame 10 comprises a plurality of spaced lateral beams 12 having two or more longitudinally extending connecting beams 14. The outer edges of each tray assembly 6 on each side of the floor 4 are in near proximity to the side walls 16 of the germination floor in a suspended position above the bottom 18 of the germination compartment. A typical germination compartment floor 18 is sloped downward to one end to permit drainage at drainage openings during cleaning.

Figure 4:
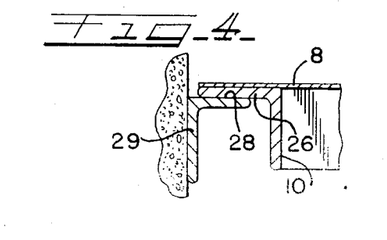
FIG. 4 is a partial enlarged sectional view of the outside edge support of the tray assemblies of the germination floor system of FIG. 2.

Each row of tray assemblies 6 is independently pivotal for rotation about a shaft in the form of a support tube 20 extending between adjacent pairs of tray assemblies 6 along the length of the floor 4. In the embodiment of FIG. 1, a tube 20 is affixed end to end to the tube of an adjacent tray assembly 6 by means of bolt assemblies or similar attachment means that interconnect plates 21 carried on the respective ends of tubes 20. An outer beam 24, which is mounted on a wall bracket 24' on each side of the floor, provides a support point typically present in a germination compartment to aid in support of the tray assemblies while loaded with grain. As best seen in FIGS. 2 and 4, the end edge portion of each tray frame 10 is formed with a lower projection 26 which contacts an upper horizontal surface 28 formed by a beam 29 of any shape suitably affixed along the side walls 16 of the germination compartment. The ends of each pair of tray assemblies interfit in the manner shown in FIG. 5. The tray frame 10 of one tray assembly 6 includes an edge portion 30 that is disposed beneath the bottom surface of the edge portion 32 of an adjacent tray assembly 6. In the closed position, edge portions 30 and 32 contact each other in a manner to prevent grain from falling through the floor. A counterweight (not shown) may be attached to the tray assemblies 6 to bias them in the direction of lifting to lighten the load.

The tray assemblies 6 are supported adjacent their center ends by a plurality of stands 34 positioned beneath the tray assembly 6 on each side of the longitudinal center line of floor 4. The stands 34 alternatively can be positioned beneath more than one tray assembly where adequate support can be provided in such an arrangement. The stands 34 each include a pair of legs 35 and 36, such that leg 35 is angularly oriented in relation to the more vertical leg 36. It is within the scope of the invention to orient the stand in the opposite manner by which the leg 35 becomes generally vertically oriented, and leg 36 is angularly oriented in a similar manner as leg 35 in FIG. 2. The legs 35, 36 are reinforced by a cross member 36a. The legs 35, 36 carry a plate 37 welded to the top of the legs and possessing a hole. The pairs of stands 34 are unitarily connected by a base member 38 welded or otherwise attached to legs 35, 36 at their respective lower ends. The base member 38 strengthens the stands 34 and establishes proper spacing to insure that edges 30, 32 accurately meet.

Figures 6, 8, 9:
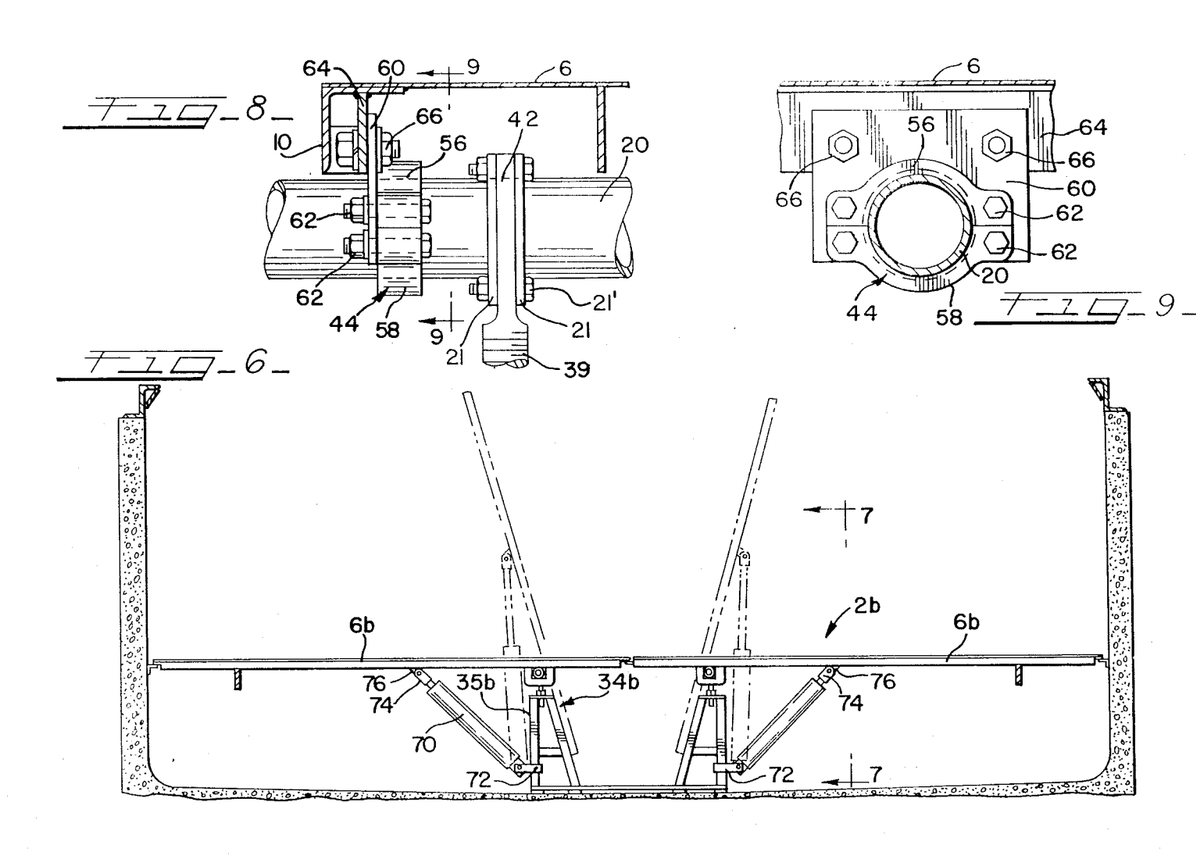
FIG. 6 is a sectional view of a third embodiment of the invention employing pneumatic cylinders with optional spring lift devices for tray assemblies.
FIG. 8 is a partial enlarged schematic view showing a support bearing for a tray assembly of the germination floor of the embodiments of FIGS. 1, 3, and 6.
FIG. 9 is a partial sectional view taken along lines 9—9 of FIG. 8.

A threaded shaft 39 extends upward through the hole of the plate 37 and carries an attachment member 42 which embraces the support tubes 20, as best shown in FIG. 8. As seen in FIG. 8, the attachment member 42 is imposed between tube end plates 21 which are affixed together at the interface between adjacent tubes 20. The threaded shaft 39 may be moved up and down in the hole in the plate 37 in conjunction with jam nuts 39' on each side of the plate to adjust the vertical position of the tube embracing structure 21, 42 to accommodate the sloped orientation of the germination floor 18 and maintain alignment and parallelism of the trays and support tubes. In light of the fact that the floor 18 deviates a significant vertical distance from end to end within the germination compartment, compensation for the height may be provided in accordance with the invention by using different size stands 34 at different positions along the length of the floor, by aligning the tubes 20 in an offset fashion at selected points along the length of the floor, or by using additional support to vary the height of a standard size stand.

Each of the tray assemblies 6 is independently pivotal from a horizontal orientation on bearing means 44 (FIG. 8) about the axis of tubes 20 to a position approximately shown in FIG. 2. Although the tray assemblies 6 are pivoted to an upright position, which is less than 90° from its horizontal orientation in FIG. 2, it is within the scope of the invention to rotate the tray assemblies 6 to a vertical position or a position more than 90° from the horizontal orientation where appropriate. In such situations, the orientation of legs 35, 36 may be reversed, as previously described, to allow a vertical position. An upright position beyond 90° may be attained by offsetting the axis of tubes 20 with respect to the axis of threaded shaft 39 or by other techniques as desired.

Each of the tray assemblies in the embodiment of FIGS. 1 and 2 is manipulated to the vertical position by personnel moving along the floor, picking up a tray assembly at an appropriate point and swinging it up to the vertical position. In view of the positioning of the pivot axis of tubes 20 proximate to the floor centerline, the effort of lifting the tray assembly 6 to the vertical position is greatly reduced in comparison to the old tray systems described herein. Each tray assembly 6 may be provided with a hand hold or some other gripping area by which the tray assembly may be conveniently grasped and personnel can move down the length of the floor 4 and pivot the tray assemblies along each side.

In the vertical position of each tray assembly 6, shown in FIG. 2 in phantom, it is desirable that the assemblies 6 be retained to prevent accidental falls upon personnel cleaning the compartment underneath the trays. Such locking may be achieved by any technique, such as by a foot operated retention assembly 46 mounted on each of the stands 34. The retention system 46 includes an enlarged end 47 to retain the end of a raised tray assebmly 6. The enlarged end 47 is carried on a pivotally mounted link 48, which is connected to a second pivotally mounted link 49, coupled together by a connecting element 49'. A foot operated pedal 50 permits the enlarged end 47 to move to a locking position in contact with the raised tray assembly 6. A spring biasing element (not shown) may be employed in a conventional manner with the link system to ensure positive urging of the enlarged end 47 of link 48 against the tray assembly 6 to prevent undesirable dislodgement. In the raised positions, it should be apparent from FIG. 2 that the area beneath the germination floor can be subjected to cleaning by using water hoses and the like in all areas beneath the floor and each tray assembly with improved removal of slime and other unsanitary material which build up typically in a germination floor. Such increased access for cleaning eliminates the hidden areas beneath fixed portions of the floor which are inherent in prior germination floors.

Figure 7:
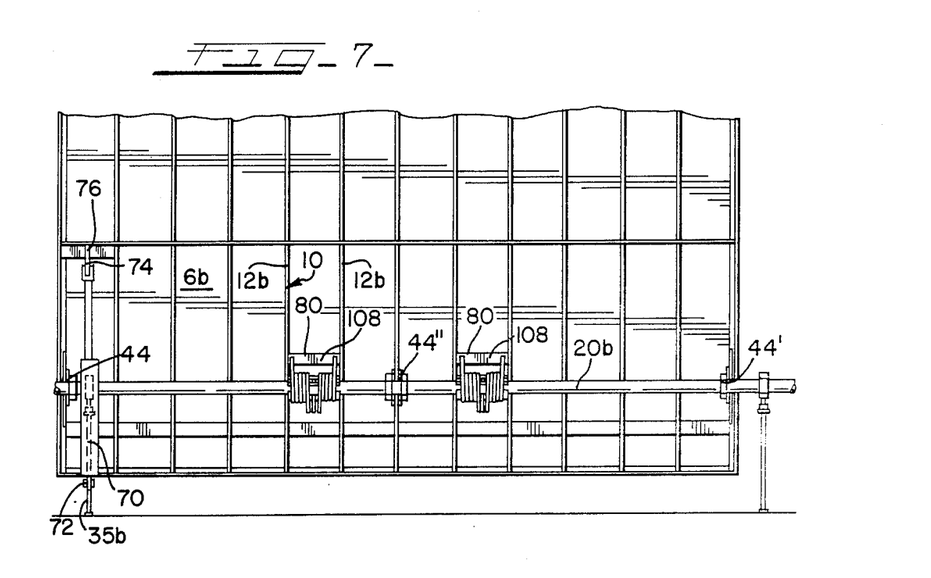
FIG. 7 is a partial side view taken along lines 7—7 of the germination floor system of FIG. 6 showing a tray assembly in a raised position, and employing optional spring torsion devices with the tray assemblies.

Referring now to FIGS. 8 and 9, there is illustrated details of the bearing structure for supporting a tray assembly 6 on tube 20. In FIGS. 8 and 9, the bearing assembly 44 on one edge portion of the tray assembly 6 is shown, while a similar bearing structure may be used at the other edge portion in the manner of bearing assembly 44', as shown in FIG. 7 in accordance with the power assisted system of the invention. In addition, a bearing 44" (FIG. 7) may be used between the two bearing 44, 44'. The bearing assembly 44 includes upper and lower sections 56, 58 which embrace the tube 20 and include an internal bearing surface of a suitable bearing material. The sections 56, 58 are retained on a vertically oriented plate 60 by means of bolt assembly 62. The vertical plate 60 is in turn carried on a vertical member 64 by means of a pair of bolt assemblies 66. The vertical member 64 may be affixed to a portion of the tray frame 10 through welding or other attachment techniques. The bearing structure 44 provides a low friction pivoting means that may be quickly and easily installed at the site. an angle less than 90° from its normal horizontal position as shown or pivoted to 90° greater in accordance with the invention.

The embodiment of the system, 2b further includes a spring biasing assembly 80 by which the tray assembly 6b is resiliently urged about the axis of torque tube 20.

Figure 10:
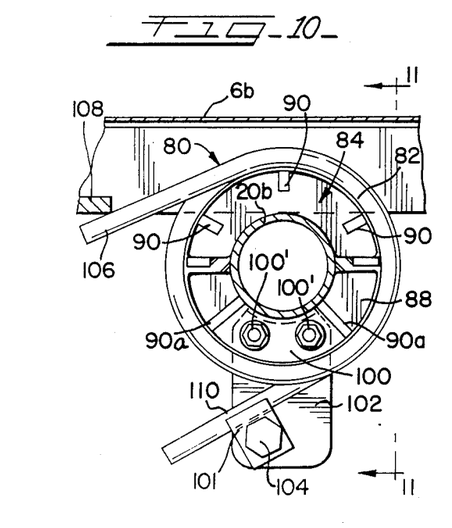
FIG. 10 is an enlarged end view, with parts in section, of one of the spring torsion devices of the tray assembly of FIG. 7.
Figure 11:
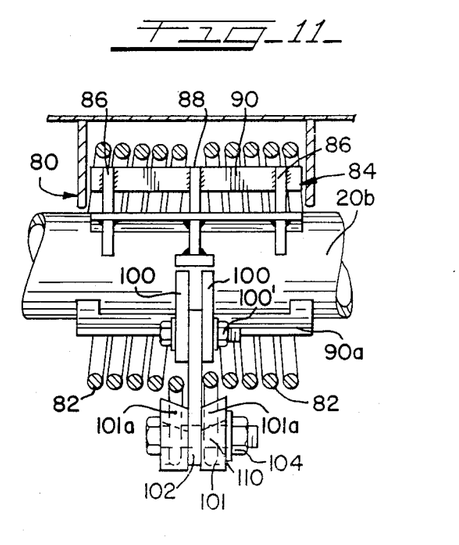
FIG. 11 is a side schematic view taken along lines 11—11 of FIG. 10.

In FIG. 7, a pair of spring assemblies 80 are shown, but any number of such devices from one, to more than two, may be employed with the invention. It should also be noted that the spring devices 80 may be used in the manual embodiment of the invention shown in FIGS. 2 and 3, in addition to being a supplement to the power assisted embodiment of system 2b. As shown in FIGS. 10 and 11, the spring assembly 80 includes a torsion spring 82 which is carried as two pairs of springs at each assembly 80. The spring retainer 84 includes two at least partially concentric end discs 86 and a central disc 88 aligned in spaced relationship.

Figure 3:
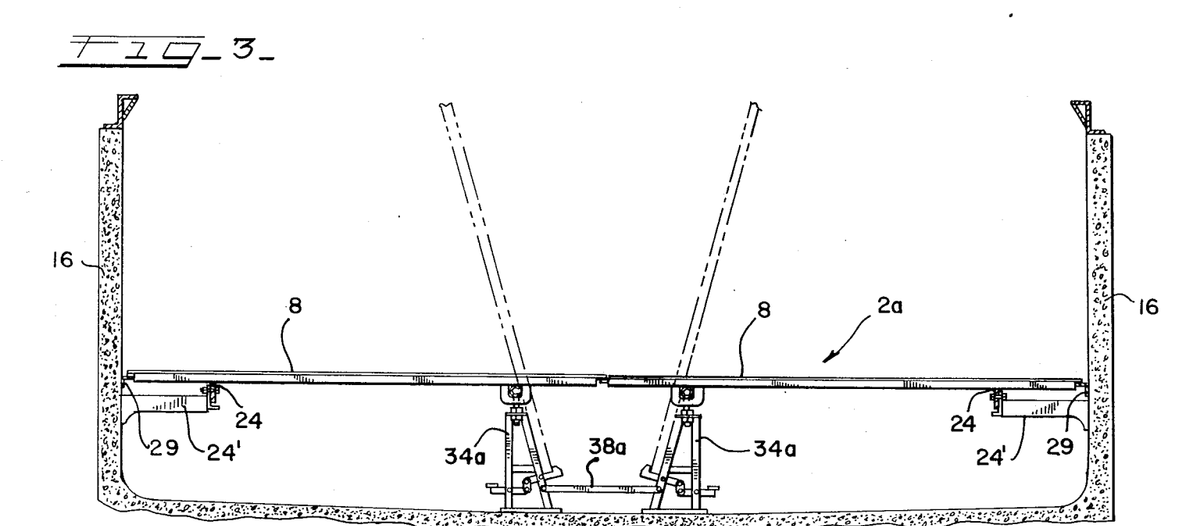
FIG. 3 is a sectional view of a second embodiment of the germination floor system of the invention.

The discs 86, 88 may be formed as upper and lower sections together to form each of the discs and are mounted in surrounding relationship to the torque tube 20b. The spacing between the upper section of discs 86, 88 is maintained by three flat rods 90 welded to the discs. The lower section of discs 86, 88 includes a pair of welded rods 90a. A pair of plates 100 are welded to a lower section of tube 20b and support a downward depending plate 102 that is affixed between plates 100 by bolt assembly 100'. A pair of spring blocks 101 are supported on each side of the lower portion Referring now to FIG. 3, there is illustrated another embodiment of the germination floor assembly of the invention identified by reference numeral 2a. The embodiment of FIG. 3 is a manually operated system nearly identical to the system of FIGS. 1 and 2, with the exception that the base member 38 interconnecting respective stands 34 in FIG. 2, have been replaced by a link member 38a for stands 34a, establishing proper separation and better anchoring.

Referring now to FIG. 6, there is illustrated a third embodiment of the invention, generally designated by reference numeral 2b. The embodiment of FIGS. 6, 7, 10 and 11 is similar to the manual version of FIGS. 1 and 2, with the added feature of a pneumatic power assist for automatically raising each tray assembly 6b or a group of tray assemblies 6b. The automatic capability of the embodiment of FIG. 6 is provided by a conventional pneumatic cylinder 70 pivotally mounted to a bracket 72 carried by leg 35b of stand 34b. The pneumatic cylinders 70 may respectively be attached to a tray assembly 6b or a single cylinder 70 may be connected to two or more tray assemblies (not shown). The tray assemblies 6b may raise the trays on a sequential basis or all tray assemblies 6b can be simultaneously lifted on one side. The pneumatic cylinder 70 is provided with an extensible end 74 on the underside of a tray assembly 6b, such that upon extension of the extensible end 74, the tray assembly 6b will assume the generally vertical or upright position shown in FIG. 6. As in the previous embodiments, the tray assembly may be pivoted for cleaning to of the plate 102 and are retained by bolt assembly 104. Each pair of springs 82 has an end 106 arranged to contact a beam 108 (FIGS. 7 and 10) which is affixed between adjacent cross beams 12b of the tray frame 10. The opposite ends 110 of the springs 82 are loaded against a seat 101a formed in the spring blocks 101 to cause a resilient urging of the tray assembly 6b about the axes of tubes 20b. The spring assembly reduces the effort required in lifting each of the tray assemblies 6b and biases the tray frame 10 in its upright position for safety reasons when raised.

Referring now to FIGS. 12 through 23, there is illustrated still another embodiment of the improved germination system of the invention and generally designated by reference numeral 120. The germination floor 120 includes adjacent pairs of swingable tray assemblies 122 which may be mounted within a germination compartment in a similar manner as shown in FIG. 2 of the previously described embodiment. The upper surfaces 124 of the tray assemblies 120 form a generally continuous floor in the horizontal orientation of the tray assemblies. Although the embodiment of FIGS. 12-23 is equipped with a power assist mechanism, i.e. pneumatic cylinders in connection with a unique torsional spring mechanism, the germination system 120 may employ manually swingable tray assemblies 122 assisted by the torsional spring mechanism. Generally, the tray assemblies 122 in the manual version of the invention are of a smaller individual construction than in the power assist version to facilitate lifting.

Figure 12:
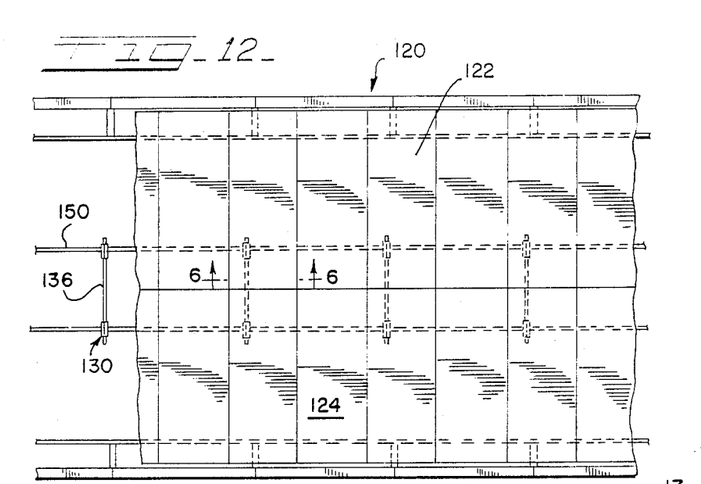
FIG. 12 is a top partial schematic view, with parts broken away, of still another embodiment of the germination floor system of the invention.
Figure 13:
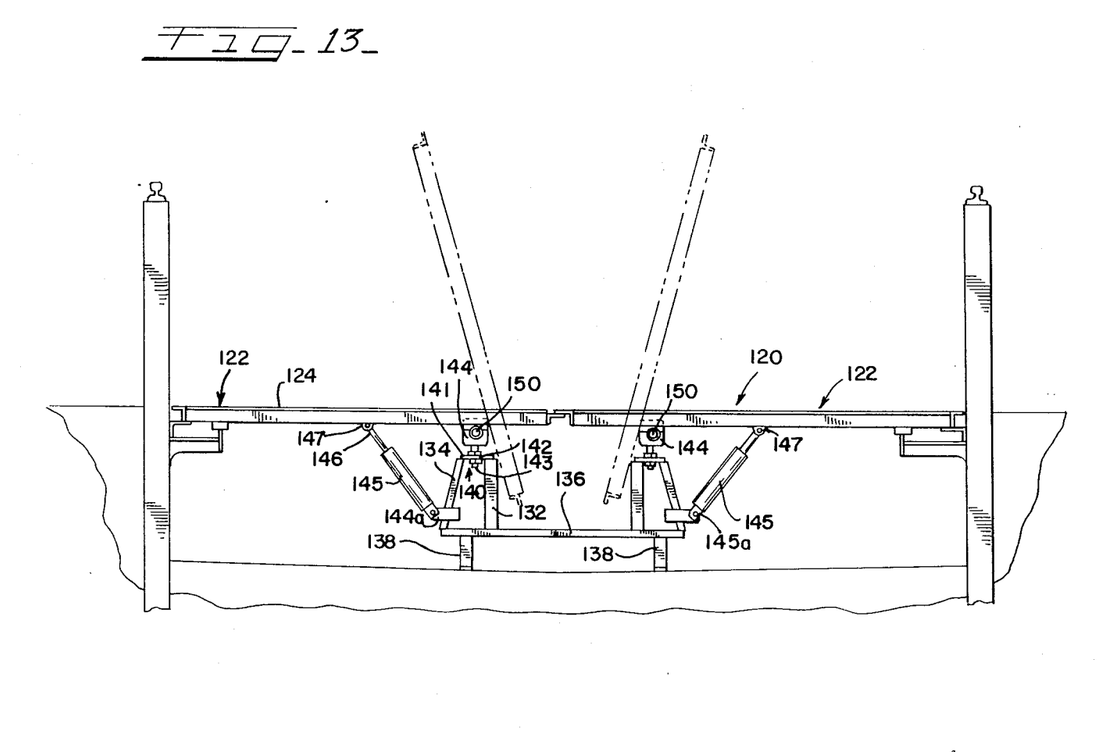
FIG. 13 is an end view of the germination floor system of FIG. 12.
Figures 14, 15:
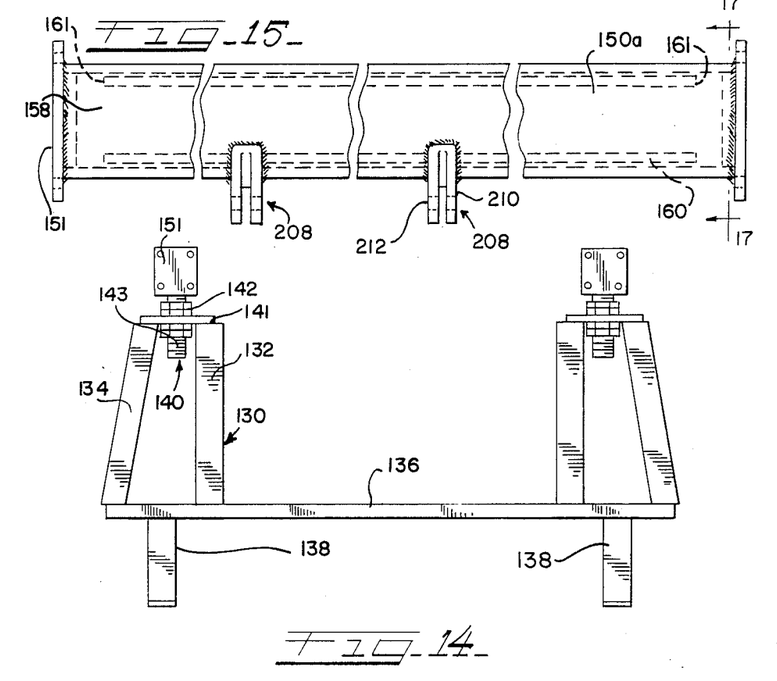
FIG. 14 is an end schematic view of the support stand assembly for carrying the germination floor of FIG. 12.
FIG. 15 is a side schematic view of a support tube segment forming the support tubes of the germination floor assembly.

Referring now to FIGS. 12, 13 and 14, a plurality of stand assemblies 130 are shown positioned beneath the tray assemblies 122 in a row positioned along the longitudinal centerline of the floor system. The stand assemblies 130 include two inner vertical upper legs 132 and outer angular legs 134 to form dual stands having a unitized design. Each individual stand is interconnected to the adjacent stand by means of a bar 136 to automatically establish the proper spacing of the stands along the length of the floor. The stand assemblies 130 are carried by lower legs 138. The top of the legs 132, 134 support an adjustable shaft assembly 140 on a plate 141 in conjunction with jam nuts 142. A threaded shaft 143 may be vertically adjusted relative to the stand to vary the height of the stand to compensate for misalignment of the tray assemblies 122. As shown in FIG. 13 a bracket 144a is affixed to outer legs 134 by stand assembly 130 to secure the fixed end of pneumatic cylinders 145. The extensible end 146 of the pneumatic cylinder is affixed to the tray assembly by an upper bracket 147. The pneumatic cylinders are connected to a source of pressurized air and pneumatic control circuits (not shown). Activation of the control circuit will effect automatic raising and lowering of the tray assemblies 122, preferably on a sequential basis, to the positions shown in FIG. 13.

The upper ends of the threaded shaft 143 of stand assemblies 130 are secured by bolted bracket assemblies 144 (FIG. 19) to respective elongated support tubes 150 that extend beneath each row of tray assemblies 122. The support tubes 150 comprise a plurality of tube segments 150a having the form shown in FIG. 15. The segments are bolted end to end through connection plates 151 to form a continuous shaft for substantially the length of the germination floor system 120.

Figures 16, 24, 25, 26:
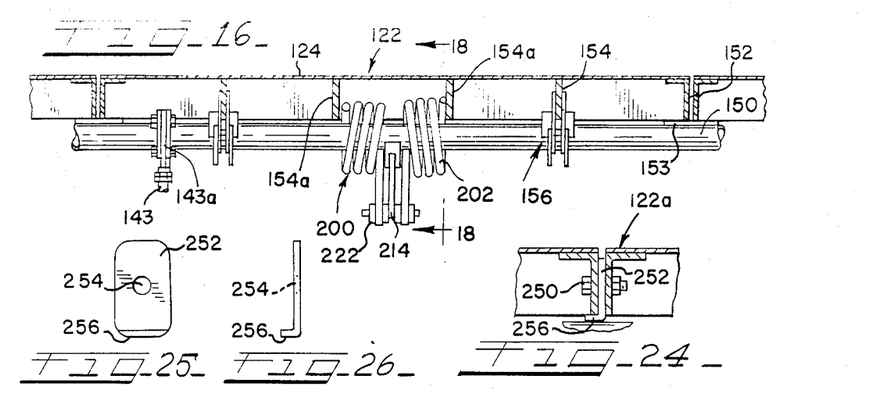
FIG. 16 is an end schematic view taken along lines 16—16 of FIG. 12 showing the tray assembly of the invention.
FIG. 24 is an enlarged sectional view of another embodiment of the germination floor system of the invention having selected numbers of tray assemblies affixed together as units.
FIG. 25 is a front plan view of the shim used in the tray attachment technique of FIG. 24.
FIG. 26 is a side schematic view of the shim of FIG. 25.
Figures 17, 17A, 18, 22, 23:
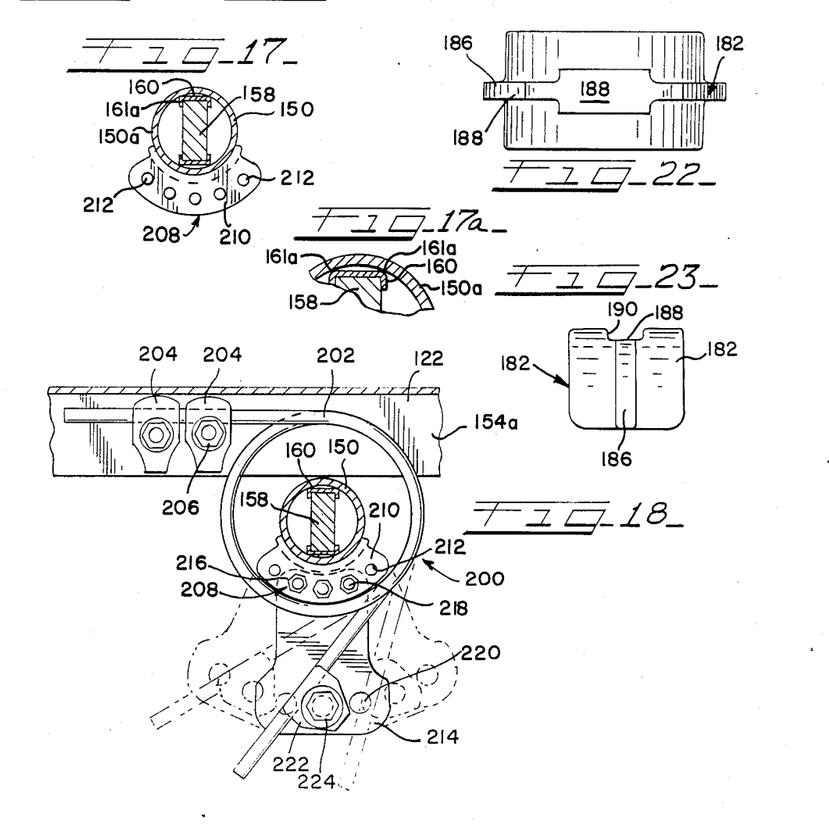
FIG. 17 is an end sectional view taken along lines 17—17 of FIG. 15.
FIG. 17a is an enlarged partial end view of the shim and bar within the tube as illustrated in FIG. 17.
FIG. 18 is a partial schematic end view, with parts in section, showing the improved torsion spring mechanism of the invention.
FIG. 22 is a top schematic view of the bearing shoe of FIG. 21.
FIG. 23 is a side schematic view of the bearing shoe of FIG. 22.
Figure 20:
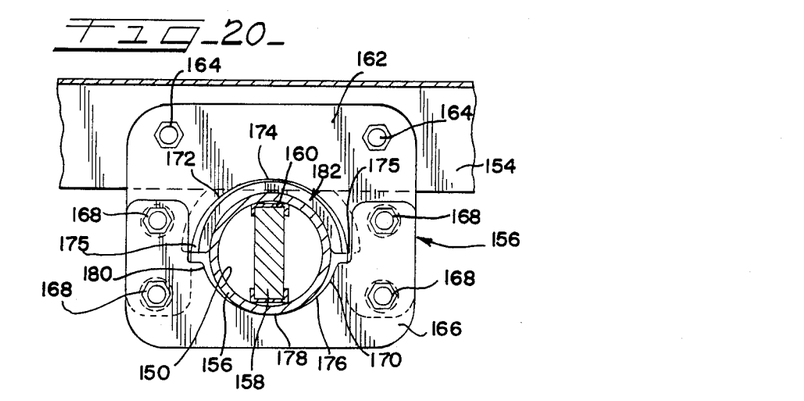
FIG. 20 is an end sectional view taken along lines 20—20 of FIG. 19.
Figure 21:
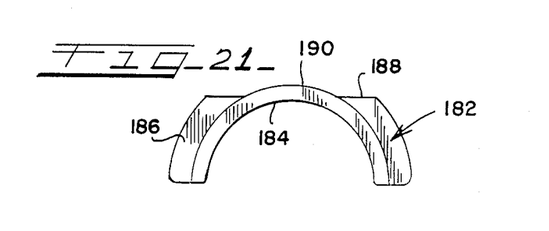
FIG. 21 is an end view of the bearing shoe used in the bearing assembly of FIG. 19.

Referring to FIG. 16, the construction of each individual tray assembly 122 is best shown. The tray assembly 122 includes a pair of outer frame members 152 and a plurality of intermediate support members 154 and 154a extending beneath the tray surface 124. A plate 153 is affixed to the bottom of one tray assembly 122 and extends beneath an adjacent tray assembly 122 as shown in FIG. 16. The plate 153 prevents the tray assembly 122, to which it is attached, from lifting until the adjacent tray assembly 122 is lifted. By placing plates 153 between adjacent tray assemblies 122, a sequential raising and closing of the tray assemblies will occur as the tray assemblies are raised and lowered by power assist. The trays are mounted for pivotal movement relative to the support tube 150 through the means of a unique bearing assembly 156. As stated previously, support tube 150 comprises a plurality of end to end hollow cylindrical tubes 150a. An elongated rectangular bar 158 of solid construction extends the length of each of the tube segments 150a, as shown in FIGS. 15, 17 and 20. The bar 158 is attached to each segment of the tubes at each end thereof by means of shim 160 affixing the bar 158 to the tube 150a by welding and the like. The shim 160 has a modified U-shape construction and projects from a position 161 within the end of the tube segment 150a to the adjacent end of the tube segment 150a. The surfaces 161a contacting the interior of the tube have a radius of curvature to provide a close fit between bar 158 and the internal dimension of the tube 150a. the curved surface 161a further reduces frictional contact. The hollow design of the tubes 150a greatly reduces the cost of fabricating the support tube of the system while attaining a significant increase in torsional strength through a unique design.

Referring now to FIGS. 19-23, details of the bearing assembly 156 for supporting a tray assembly 122 on the support tube 150 are shown. Although any number of bearing assemblies 156 may be used to support an individual tray assembly 122, two such bearing assemblies 156 are shown in FIG. 14.

Bearing assembly 154 includes a pair of upper plates 162 clamped on both sides of a tray assembly support 154 by means of bolt assemblies 164. A pair of lower plates 166 are affixed to a lower portion of upper plates 162 through a lower group of four bolt assemblies 168. The support tube 150 extends through an opening 170 created through cut-out portions in the lower edge of upper plates 162 and the upper edge portion of lower plates 166. As seen in FIG. 20, the opening 170 is defined in upper plates 162 by a curved edge portion 172 having a generally increasing radius of curvature on each side of the uppermost point 174 above the tube when viewing FIG. 20. Accordingly, the smallest radius of curvature of the curved edge portion 172 is present at point 174 in FIG. 20, while at diametrical points 175 the greatest radius of curvature is present. Similarly, the radius of curvature of the cut-out portion 176 in the lower plates 166 is smallest at a point immediately below the torque tube at point 178 and then gradually increases to points 180 on each side of the torque tube.

As seen in FIGS. 20-23, a brake shoe 182 is positioned adjacent the upper portion of the tube 150 in clamped position between the upper plates 162. The bearing shoe is in the form of a casting and the like and includes an upper tube bearing surface 184 having a radius of curvature approximately equal to the radius of curvature of the outer surface of the tube 150. The body of the brake shoe 182 includes a pair of wing-like portions 186 carried on the outer surface at a position generally intermediate of the two edges of the casting. The wing portions 186 are provided with a flattened top 188 which is in alignment with a flat notch 190 formed in the top of the brake shoe casting. Flat portions 188, 190 fit against the underside of the support member 154. The brake show 180 is arranged to rotate with the plates as the tray assembly is lifted from its horizontal position for a cleaning task.

Figure 19:
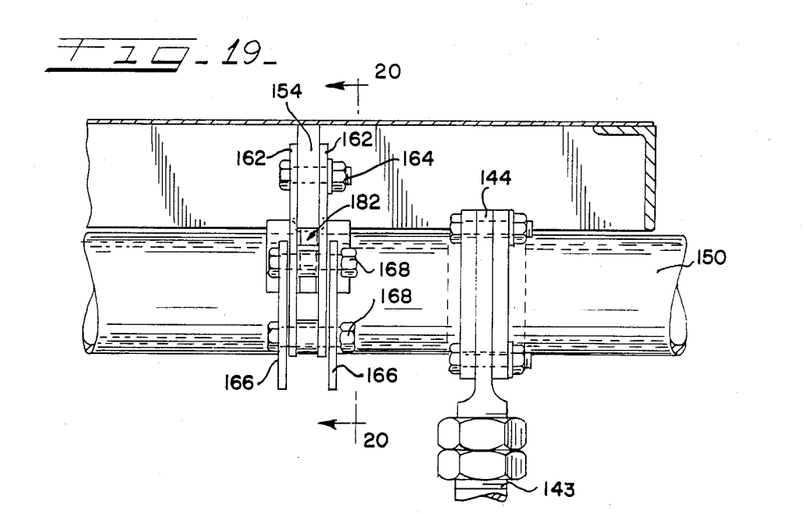
FIG. 19 is a partial side schematic view, with parts in section, showing the improved bearing assembly of the invention.

The bearing assembly 156 mounts the tray assembly 122 for smooth, pivotal movement about the axis of the support tube 150 and attains self-adjustability despite the presence of misalignment along the length of the germination floor. Misalignment of the tube axis from side to side and top to bottom occurs, because of common variations in tolerances of the parts of the system and because of irregularity in the walls and floors of the germination compartment. In the installation of a germination floor, such as germination floor 120, the installer generally visually aligns the structure along its length and deviations can occur. Despite these deviations, the design of the opening 170, providing an increasing radius from diametrically opposed points, insures the possibility of relative movement between the bracket assembly and the tube 150 in an approximate perpendicular direction to the longitudinal axis of the shaft 150 in such a manner that binding and other interference with the free pivotal movement of the tray assembly does not occur. In addition, a better bearing effect is attained despite variations in tolerances, such that a lower friction during torsional movement is encountered, particularly useful for manual operation of the floor system of the invention.

Referring now to FIGS. 15, 16, 17 and 18, details of the spring torsion mechanism 200 are shown. The spring mechanism 200 imparts an adjustable, torsional force on each tray assembly about the axis of tube 150 in a manner that it aids in raising a tray assembly to its upper position, whether the tray assembly is manually lifted or through a power assist. The spring force also provides a biasing force in an upper position to aid in the prevent of accidental falling of the raised tray. The spring mechanism 200 is shown employing a pair of torsional springs 202 coiled about a portion of the support tube 150 beneath each individual tray assembly 122. An upper end portion of each spring 202 is affixed to the inner surface of the tray support 154a by being affixed through the employment of a pair of clamps 204 which are secured to the tray assembly by bolts 206. The lower end portions of the spring 202 are disposed generally downward from the tray assembly. A bracket 208 is welded to the underside of the support tube 150, as best illustrated in FIGS. 15, 17 and 18. The bracket is formed with a pair of spaced arcuate sections 210 projecting downward from the support tube 150 and having an array of five aligned holes 212, which are disposed on a common radius to establish three positions for reasons to be described.

The upper portion of a lower spring plate 214 is inserted between the pair of sections 210. The upper portion includes three holes 216 which are designed to be aligned with any three holes 212 in sections 210. Bolt assemblies 218 are then inserted through the matching holes to secure the plate 214. As seen in phantom in FIG. 18, the positioning of plate 214 may be varied dependent on the holes 212 and 216 selected.

The lower portion of the plate 214 includes three holes 220 in which a lower spring clamp 222 may be secured by bolt assembly 224. The provision of three holes 220 permits clamp 222 to be secured at three different positions on the plate 214. The clamp 222 is provided with an open channel (FIG. 18) such that the spring 202 is maintained by its resilient force against the lower plate. By varying the position of plate 214 relative to bracket 208 and the position of clamp 222 on plate 214, the torsional force applied by spring 202 may be adjusted to a plurality of discrete levels determined by the position of the lower end portion of the spring. The spring 202 may easily be unloaded by removing its lower end portion from the clamp 222.

A change in the torsional force of springs 202 may quickly be facilitated during installation and service of the germination floor by simply changing the bolt positions within the respective holes in the bracket 208 and in the plate 214. As seen in FIG. 16, the left hand spring 202 and the right hand spring are mirror images and both are clamped to opposite sides of plate 214 by clamps 222. The spring device 200 provides a simple and inexpensive adjustment to match the load force to manually lift the trays. The design of the spring device 200 provides an effective assist that is adjustable, easy to install and can be cleaned without difficulty during use.

Referring to FIGS. 24-26, there is illustrated another embodiment of the germination floor system of the invention. The embodiment of FIGS. 24-26 employ bolt assembly 250 to connect two or more tray assemblies to a single unit. This configuration is particularly useful in the power assist version where multiple tray assemblies may simultaneously be lifted. A shim 252 is imposed between adjacent tray assemblies 122a and includes a hole 254 through bolt assembly 250 extends. A flange 256 is provided at the bottom of shim 252. The bolt assembly 250 is tightened to unitize the tray assemblies 122a, and the compression on the bolt is backed off at installation to allow a small degree of relative movement. The purpose of shim 252 is to adjust or compensate when bolting several trays together to attain total combined width.

Referring now to FIGS. 27 to 31, there is illustrated still another embodiment of the tilt-up germination floor apparatus of the invention utilizing a modified tray assembly 300. The tray assembly 300 is used with a plurality of tray assemblies (not shown) as in the proceeding embodiments. Each tray assembly 300 is designed to be mounted in a manner to be raised for cleaning as contemplated in the embodiments of FIGS,. 1-11 and 12-23 as previously described. The tray assembly 300 is modified to reduce the presence of exposed edges of perforated tray sheets attached to the top of the tray assembly 300 is the longitudinal direction of the compartment along which turning machines move during germination and removal plows move after germination. The presence of free edges of sheets can interfere with the efficient turning and removal of grain from the germination floor after germination by turning machines and plows, which equipment also can damage the exposed sheet edges.

Figures 27, 29, 30:
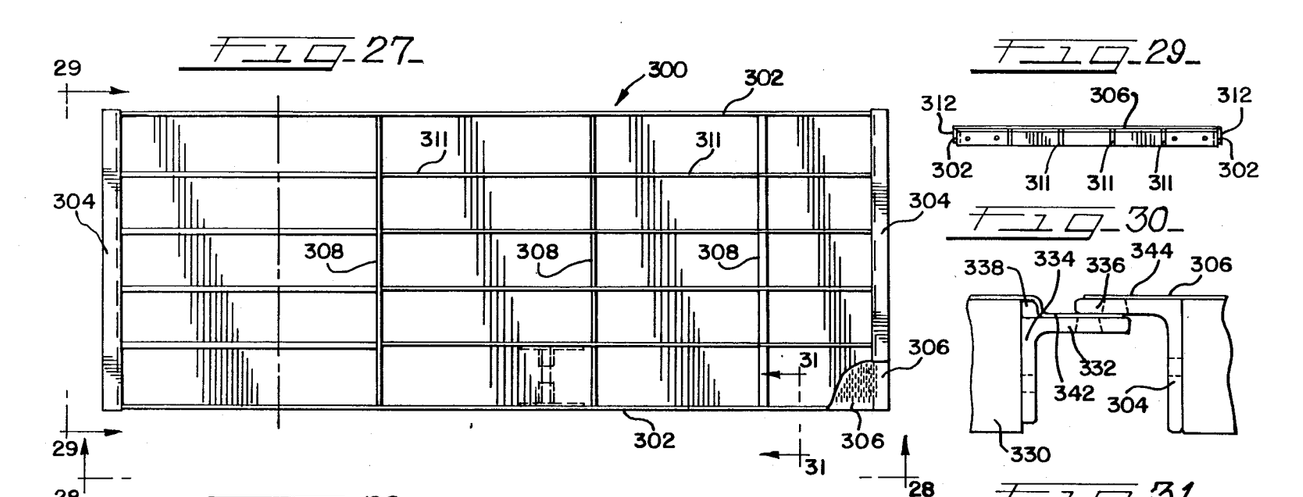
FIG. 27 is a top plan view with a portion of the tray sheet shown of the germination floor of the invention.
FIG. 29 is an end view taken along lines 29—29 of FIG. 27.
FIG. 30 is a partial side elevational view of the tray assembly of the germination floor of FIG. 27 contacting an adjacent tray assembly having a modified construction.
Figure 28:
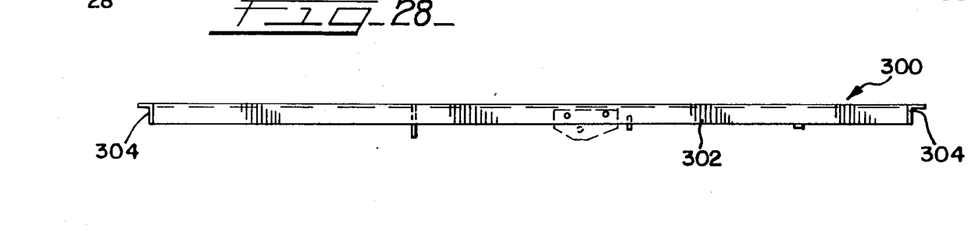
FIG. 28 is an elevational view taken along line 28—28 of FIG. 27.
Figure 31:
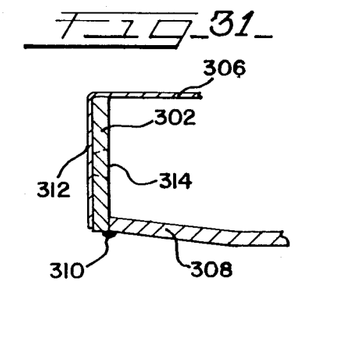
FIG. 31 is an end sectional view taken along line 31—31 of FIG. 27.

In FIGS. 27 and 28, tray assembly 300 includes a frame having an outer rectangular configuration formed by a pair of upright flat bar members 302 and a pair of end beams 304 in the form of angle members. A preforated tray sheet 306 is affixed to side bars 302 and cross beams 304 by welding and the like. Three or more strenghtening bars 308 extend between side bars 302 to provide structural integrity. As seen in FIG. 31, the side bars 302 are affixed to the strengthening bars 308 by welds 310. The bars 302 are also welded to end beams 304. The tray frame is further strengthened by bars 311 (FIG. 27).

The edge portions 312 of the tray sheets 306 are bent down against the outer surface of side bars 302 as best shown in FIGS. 29 and 31. The tray sheets 306 are affixed at both sides of side bars 302 by plug welds 314 or similar techniques. By such attachment of the sheet, no edges of tray sheets are exposed at both sides of the tray assembly. The edge portions 312 of the tray sheets are also flush with the ends of end members 304. Where the tray assembly is arranged to be used with plows and the like that move in one direction, the tray sheet may be bent over one of the side beams 302 that serves as the leading edge exposed to the direction of movement of the equipment, but not on the trailing side of the tray assembly 300 (not shown).

Figure 5:
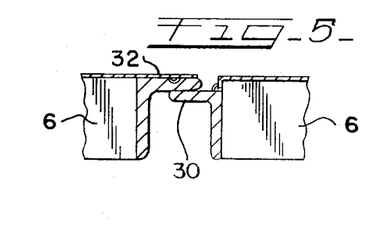
FIG. 5 is a partial enlarged sectional view showing the center edge contact between adjacent tray assemblies of the germination floor system of FIG. 2.
Figure 5A:
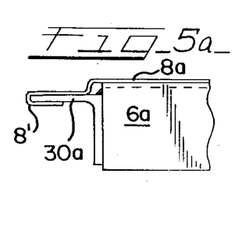
FIG. 5a is a partial enlarged sectional view of an alternative tray assembly for the germination floor system of the invention using crimped attachment of the sheets to the trays.

The ends of tray assembly 300 are arranged for overlapping contact with an adjacent tray assembly 330 as shown in FIG. 30 in the closed configuration of the germination floor as previously described with reference to FIGS. 3 and 5. As was the case in FIG. 5, the lip 332 of the center end beam 334 is beneath the plane of the upper sheet 306. With such an arrangement, the end beam 334 is modified as compared to end beam 304. End beam 304 is an angle iron having upper lip 336 in alignment with the upper surface of the tray assembly 300. The end beam 334 includes an upper portion 338 having an edge terminating in alignment with the top surface of tray assembly 330. Thus, the end portion 342 of tray sheet 306, affixed to frame assembly 330, is flanged downward over upper portion 338 and lip 332. The opposite end portion 344 of sheet 306 of tray assembly 300 lies flat over lip 336. Each of the sheet portions 342 and 344 are affixed to lips 332 and 336 by welds. The sheet edge may also be wrapped around lip 336 in the manner illustrated in FIG. 5a. Except for end member 334, tray assembly 330 is otherwise identical to tray assembly 300.

What is claimed is:

1. A germination floor apparatus comprising floor means having a top side for carrying a load of grain and an underside; said floor means including a plurality of tray assemblies arranged in a plurality of rows extending along the length of said floor means;

support means positioned beneath said plurality of tray assemblies for carrying said tray assemblies in an elevated position;

pivot means supported on said support means and said pivot means having tube means for carrying said tray assemblies in said plurality of rows for pivotal movement about an axis extending along the length of each of said plurality of rows;

said tray assemblies being movable about said axis extending along the length of each of said rows of said plurality of rows, said tray assemblies being moveable between a horizontal position for carrying the load of grain and an upright position to permit access to the underside of said floor means for cleaning;

said tray assemblies each having a frame formed by a pair of side members interconnected with a pair of end members being disposed in parallel relationship to said axis, said side members each having an upper surface, an outer side surface, and a bottom surface:

a perforated tray sheet being affixed to each of said tray frames;

said tray sheets having at least an edge portion being bent over said top surface into contact with said outer side surface of one of siad side members, and means for affixing said edge portion to said outer side surface of said side members, said side members are a pair of flat bar members, a plurality of rigid cross members, said cross members having a pair of end portions being respectively affixed to said bottom surface of said side members, said end members are angle members having an outward lip portion to overlap the lip portion of an adjacent tray frame, and said lip portion of the tray assembly of one of said rows of tray assemblies is disposed above the lip portion of an adjacent row or tray assemblies in horizontal alignment with said top side of said floor means.

2. The germination floor according to claim 1 wherein said tray sheet includes a pair over said top surface into contqct with said outer surface of one of said outer surfaces of one of said side members of edge portions respectively bent.

3. The germination floor according to claim 2 further including means to one of said outer surfaces respectively affix said pair of edge portions to.

* * * * *